(12) United States Patent
Mikami et al.

(10) Patent No.: US 6,495,751 B2
(45) Date of Patent: *Dec. 17, 2002

(54) SPACE PHOTOVOLTAIC POWER GENERATION SYSTEM, POWER SATELLITE, AND ELECTRIC POWER BASE

(75) Inventors: Izumi Mikami, Tokyo (JP); Yoshihiko Konishi, Tokyo (JP); Kazuyuki Takada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/871,895

(22) Filed: Jun. 4, 2001

(65) Prior Publication Data

US 2002/0029796 A1 Mar. 14, 2002

(30) Foreign Application Priority Data

Sep. 14, 2000 (JP) ......................................... 2000-279785

(51) Int. Cl.⁷ ........................... H01L 31/042; B64G 1/44
(52) U.S. Cl. ........................ 136/292; 136/244; 136/246; 244/173; 322/2 R
(58) Field of Search ................................. 136/292, 244, 136/246; 244/158 R, 159, 173; 322/2 R

(56) References Cited

U.S. PATENT DOCUMENTS 3,781,647 A * 12/1973 Glaser .......................... 322/2 R
5,223,781 A * 6/1993 Criswell et al. ............. 322/2 R
5,885,367 A * 3/1999 Brown et al. ................. 136/245

OTHER PUBLICATIONS

U.S. patent application Ser. No. 09/838,271, filed 04/20/01, pending.
U.S. patent application Ser. No. 09/871,898, filed 06/04/01, pending.
U.S. patent application Ser. No. 09/871,895, filed 06/04/01, pending.
U.S. patent application Ser. No. 09/871,984, filed 06/04/01, pending.

* cited by examiner

Primary Examiner—Nam Nguyen
Assistant Examiner—Brian L Mutschler
(74) Attorney, Agent, or Firm—Oblon, Spivak, McClelland, Maier & Neustadt, P.C.

(57) ABSTRACT

A space photovoltaic generation system including a plurality of power satellites arranged in space, each of which converts electrical energy, into which sunlight has been photoelectric-converted, into a microwave, and transmits the microwave to an electric power base. The system can thus transmit a microwave of high power to the electric power base. Each of the plurality of power satellites modulates the generated microwave so as to generate an incoherent microwave before transmitting it to the electric power base, thus reducing the power density of the electric power transmitted to the electric power base on the earth and hence a loss in the total amount of energy transmitted to the electrical power base on the earth.

20 Claims, 3 Drawing Sheets

SPACE PHOTOVOLTAIC POWER GENERATION SYSTEM, POWER SATELLITE, AND ELECTRIC POWER BASE

BACKGROUND OF THE INVENTION

1. Field of the Invention

The present invention relates to a space photovoltaic power generation system for receiving sunlight in space so as to generate electric power, for transmitting the electric power to an electric power base via space by converting the electric power to a microwave, and for storing the electric power in the electric power base so as to allow the use of the electric power, and a power satellite and an electric power base for use with the system.

2. Description of the Prior Art

A solar cell is known as a small-size power generation system which utilizes sunlight. Furthermore, a photovoltaic power generation panel or the like, which can be set up on a building, is known as a power generation system intended for the home which utilizes sunlight. Such a photovoltaic power generation system built on the earth is not necessarily efficient fundamentally because of the attenuation of sunlight in the earth's atmosphere and the alternation between shade and light caused by the alternation between day and night. A solar panel, which can be installed in a satellite, is known as a photovoltaic power generation device intended for space. Satellites can thus achieve missions by privately generating necessary electric power for observation and communications, etc. by using a solar panel. In either of the prior art power generation systems, specific equipment connected to the solar cell by cable is adapted to use the energy generated by the solar cell.

On the other hand, as the communication technology progresses according to results of recent space development works and the construction technology to construct a large-scale space structure progresses, research and development of a system that receives sunlight in space, generates electric power, and transmits the generated energy to a specific place such as a specific location on the earth or in space has been actively conducted. There can be provided an example of such a space photovoltaic power generation system including a plurality of power satellites arranged in space, each of which can focus sunlight to a number of solar panels, photoelectric-convert the incident sunlight so as to generate electric power, and then generate a microwave based on the generated energy and transmit the microwave to an electric power base built on the earth. The electric power base built on the earth includes a receiving antenna for receiving incident microwaves. The electric power base converts the received microwaves into DC signals and then combines DC electric power.

To improve the power generation capability of the prior art space photovoltaic power generation system constructed as above, a large number of power satellites each for transmitting a microwave towards the ground by a transmission antenna thereof should be arranged in space. A problem is, however, that the microwaves transmitted, via the transmission antennas of the plurality of power satellites, from the plurality of power satellites interfere with one another. It can be assumed that the group of transmission antennas is a single huge phased array antenna for transmitting microwaves. A problem is, however, that as the number of power satellites is increased to improve the power generation capability of the space photovoltaic power generation system, the area of the array antenna defined as the group of transmission antennas is increased and the beam width of the microwave transmitted via the array antenna is therefore narrowed greatly, and this results in an increase in the per-unit-area electric power received on the earth.

SUMMARY OF THE INVENTION

The present invention is proposed to solve the above-mentioned problem. It is therefore an object of the present invention to provide a space photovoltaic power generation system capable of reducing the power density of electric power transmitted from a group of power-satellites each for generating electric power from sunlight received to an electric power base on the earth and hence a loss in the total amount of energy transmitted to the electric power base on the earth, and a power satellite and an electric power base for use with the system.

In accordance with an aspect of the present invention, there is provided a space photovoltaic power generation system comprising: a plurality of power satellites each for generating electrical energy from sunlight in space, for generating an incoherent microwave from the generated electrical energy, and for transmitting the incoherent microwave; and an electric power base located at a remote site for receiving a plurality of incoherent microwaves transmitted from the plurality of power satellites, and for generating electric power from the plurality of incoherent microwaves received.

In accordance with a preferred embodiment of the present invention, each of the plurality of power satellites includes a condensing and power generating unit for focusing sunlight in space and for converting the focused sunlight into electrical energy, and a transmission unit for generating a microwave based on the electrical energy from the condensing and power generating unit, for modulating the microwave so as to generate an incoherent microwave, and for transmitting the incoherent microwave to space. Each of the plurality of power satellites can include a plurality of condensing and power generating units each for focusing sunlight in space and for converting the focused sunlight into electrical energy, and a plurality of transmission units each for generating a microwave based on the electrical energy from the plurality of condensing and power generating units, for modulating the microwave so as to generate an incoherent microwave, and for transmitting the incoherent microwave to space.

In accordance with another preferred embodiment of the present invention, the electric power base includes a receiving unit for receiving the plurality of incoherent microwaves transmitted from the plurality of power satellites, a microwave-to-DC conversion unit for converting the plurality of incoherent microwaves received by the receiving unit into DC electric power, and a transmission unit for transmitting the DC electric power obtained by the microwave-to-DC conversion unit.

In accordance with another aspect of the present invention, there is provided a power satellite comprising: a condensing and power generating unit for focusing sunlight in space and for converting the focused sunlight into electrical energy; and a transmission unit for generating a microwave based on the electrical energy from the condensing and power generating unit, for modulating the microwave so as to generate an incoherent microwave, and for transmitting the incoherent microwave to space. Preferably, the power satellite can include a plurality of condensing and power generating units each for focusing sunlight in space and for converting the focused sunlight into electrical energy, and a plurality of transmission units each for generating a microwave based on the electrical energy from the plurality of condensing and power generating units, for modulating the microwave so as to generate an incoherent microwave, and for transmitting the incoherent microwave to space.

In accordance with a further aspect of the present invention, there is provided an electric power base comprising: a receiving unit for receiving a plurality of incoherent microwaves transmitted from a plurality of power satellites; a microwave-to-DC conversion unit for converting the plurality of incoherent microwaves received by the receiving unit into DC electric power; and a transmission unit for transmitting the DC electric power obtained by the microwave-to-DC conversion unit.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
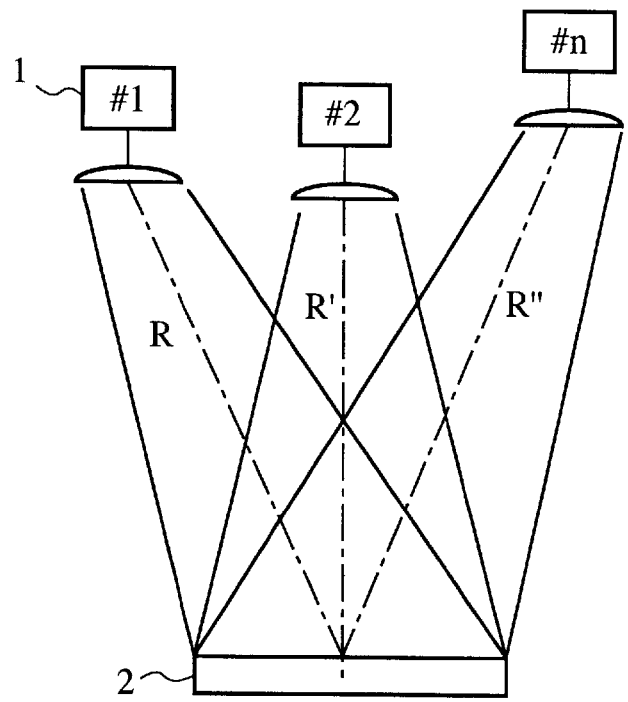
FIG. 1 is a schematic diagram showing a transmit-receive relationship between a power transmission antenna of each of a plurality of power satellites and a receiving antenna of an electric power base, in a space photovoltaic power generation system according to an embodiment of the present invention.
Figure 4:
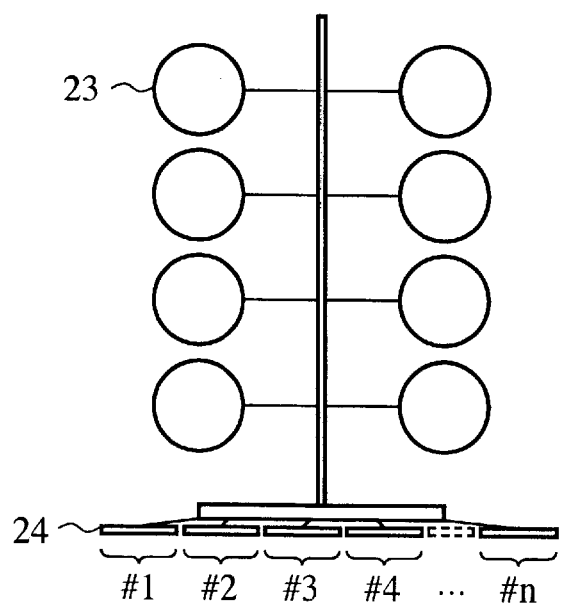
FIG. 4 is a block diagram showing the structure of an example of the power transmission antenna of each of the plurality of power satellites included in the space photovoltaic power generation system according to the embodiment of the present invention.
Figure 2:
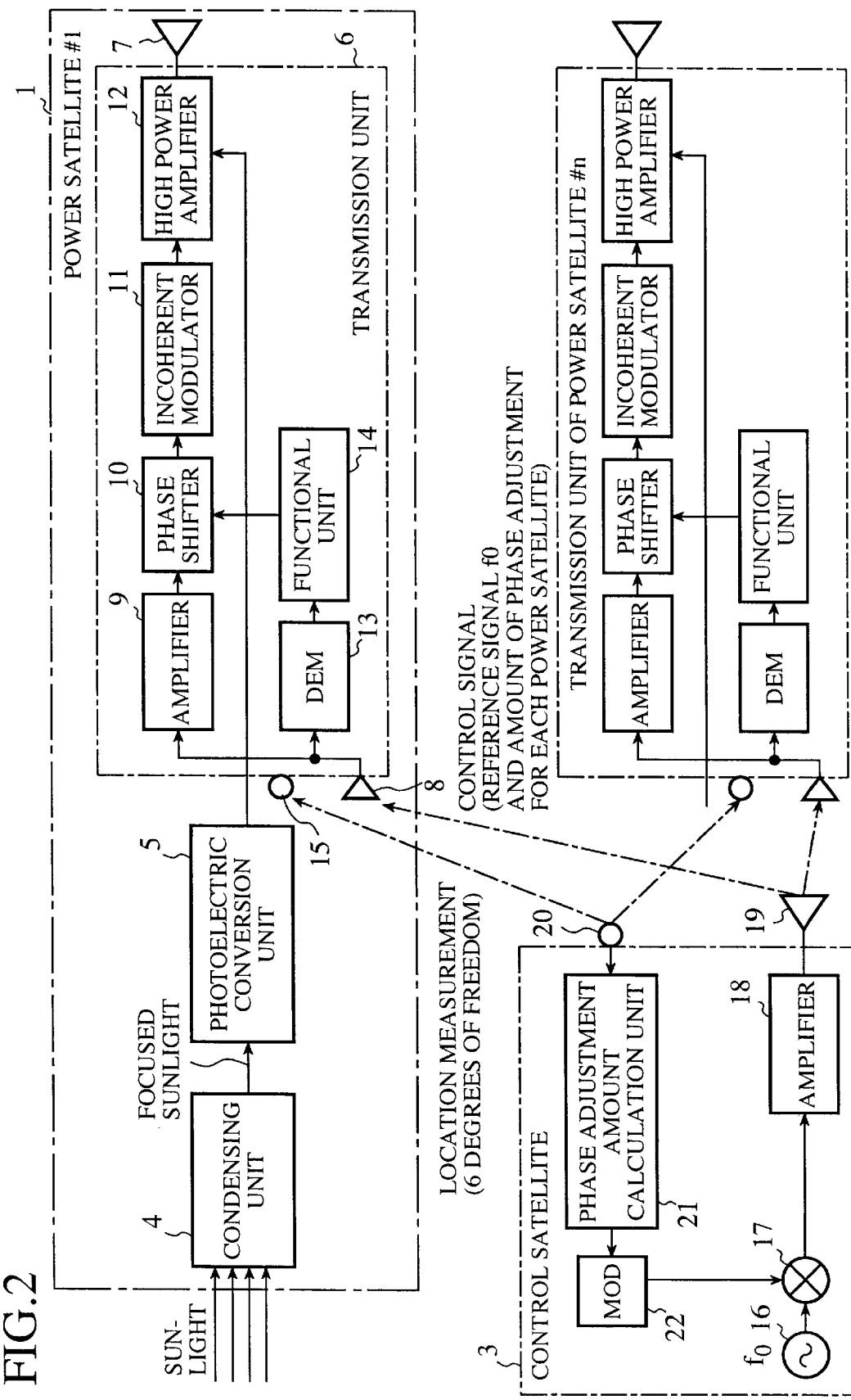
FIG. 2 is a block diagram showing the structure of each of the plurality of power satellites and the structure of a control satellite, in the space photovoltaic power generation system according to the embodiment of the present invention.
Figure 3:
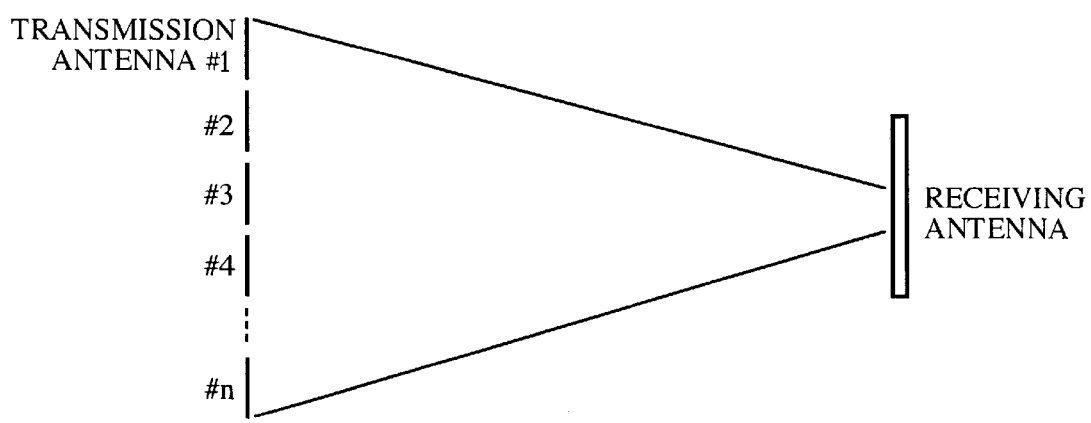
FIG. 3 is a diagram showing a basic principle underlying combining of incoherent microwaves by the space photovoltaic power generation system according to the embodiment of the present invention.
Figure 3:
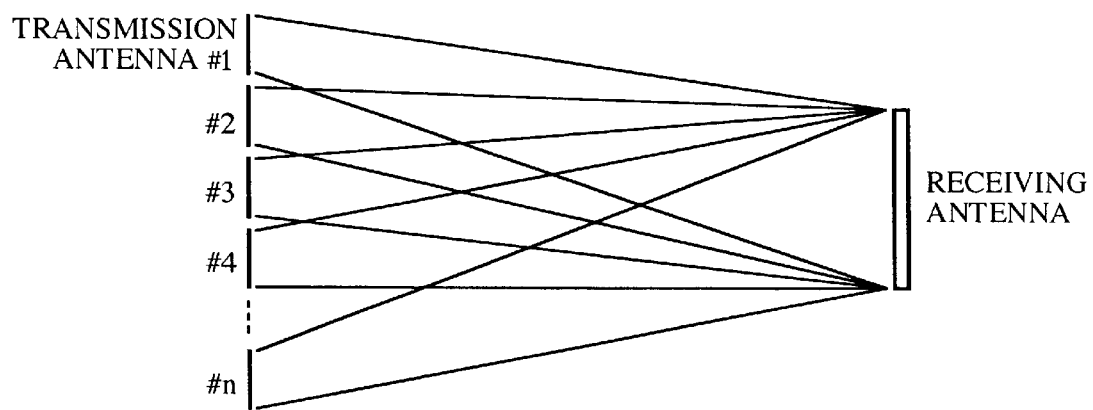

A description will be made as to a space photovoltaic power generation system according to an embodiment of the present invention, a power satellite, a control satellite, and an electric power base for use with the system, with reference to FIGS. 1 to 4. FIG. 1 is a schematic diagram showing a transmit-receive relationship between a power transmission antenna of each of a plurality of power satellites and a receiving antenna of the electric power base, in the space photovoltaic power generation system according to the embodiment. FIG. 2 is a block diagram showing the structure of each of the plurality of power satellites and the structure of the control satellite, in the space photovoltaic power generation system according to the embodiment. FIG. 3 is a diagram showing a basic principle underlying combining of incoherent microwaves by the space photovoltaic power generation system according to the embodiment. FIG. 4 is a block diagram showing the structure of an example of the power transmission antenna of each of the plurality of power satellites included in the space photovoltaic power generation system according to the embodiment.

In FIG. 1, reference numeral 1 denotes a power satellite for generating electrical energy from sunlight received in space, for generating a microwave from the electrical energy, and for transmitting the microwave. As shown. in the figure, the space photovoltaic power generation system is provided with a plurality of power satellites #1 to #n. Reference numeral 2 denotes a receiving antenna disposed in an electric power base, for receiving a plurality of microwaves transmitted from the plurality of power satellites 1.

Each of the plurality of power satellites 1 further converts electrical energy, into which sunlight has been photoelectric-converted, into a microwave, and transmits the microwave to the receiving antenna 2 of the electric power base. Each of the plurality of power satellites 1 controls the microwave so that it is incoherent. As a result, the electric power base can generate electric power that is n times as large as the electric power transmitted by each of the plurality of power satellites 1 regardless of the difference among the distances R, R', . . . , and R" between each of the plurality of power satellites 1 and the electric power base. In addition, the beam width of the microwave transmitted from each of the plurality of power satellites 1 can be prevented from reducing and the energy density (energy per unit area) can be therefore reduced.

If each of the plurality of power satellites 1 transmits the microwave to the electric power base without any control of the microwave, the microwaves from the plurality of power satellites 1 interfere with one another and the electric power generated by the electric power base is therefore reduced. In contrast, when each of the plurality of power satellites 1 transmits the microwave to the electric power base while making the microwave coherent, although the electric power base can generate electric power that is n times as large as the electric power transmitted by each of the plurality of power satellites 1, the beam width of the microwave from each of the plurality of power satellites 1 is reduced and the energy density is therefore increased.

The electric power base can be placed on the earth. As an alternative, the electric power base can be placed in such a location in space as a location of the surface of the moon, a space plant facility, or the like. When the electric power base is located on the earth, it is necessary to reduce the energy density of microwaves transmitted from the plurality of power satellites from the viewpoint of the flora and fauna environment and electric wave trouble. To this end, it is desirable to transmit microwaves after making the microwaves transmitted from the plurality of power satellites incoherent, as mentioned above. In addition, to reduce the energy density of the received microwaves, the receiving antenna 2 may have an area ranging from several tens of square kilometers to several hundreds of square kilometers. In general, such a huge antenna can be formed by arranging a number of antennas each having a specific size in the form of an array, for example. In this case, the electric power base can have a function of combining either the plurality of microwaves received via the plurality of antennas or a number of microwaves from a number of antenna groups in addition to a function of converting the composite microwave into a low-frequency wave.

Next, the structure of each of the plurality of power satellites 1 and the structure of the control satellite 3 will be explained with reference to FIG. 2. Each of the plurality of power satellites 1 is provided with a condensing unit 4 for focusing sunlight rays in space to an area, the condensing unit 4 being constructed of a catoptric system, a dioptric system, or the like. Each of the plurality of power satellites 1 further includes a photoelectric conversion unit 5 for receiving the sunlight focused by the condensing unit 4 and for converting the focused sunlight into electrical energy, a transmission unit 6 for converting the electrical energy generated by the photoelectric conversion unit 5 into a microwave, and a transmission antenna 7 for sending out the microwave to space. The transmission unit 6 is provided with a receiving antenna 8 for receiving a control signal from the control satellite 3, an amplifier 9 for amplifying a reference signal of included in the control signal, a phase shifter 10 for phase-shifting the microwave according to an amount of phase adjustment included in the control signal, an incoherent modulator 11 for incoherent-modulating the microwave output from the phase shifter 12 by using a modulation technique, such as a spread-spectrum modulation, so as to output an incoherent microwave, and a high power amplifier 12 for amplifying the incoherent microwave from the incoherent modulator 11 with high power so as to output a microwave having power corresponding to the electrical energy generated by the photoelectric conversion unit 5. The transmission unit 6 further includes a demodulation unit (DEM) 13 for demodulating the control signal from the control satellite 3, and a functional unit 14 for generating and providing an instruction to the phase shifter 10 based on the amount of phase adjustment included in the control signal. Each of the plurality of power satellites 1 further includes a corner reflector 15 disposed to enable the control satellite 3 to measure the location of each of the plurality of power satellites 1. The corner reflector 15 only has to reflect either light or electromagnetic waves including light. The control satellite 3 is provided with an oscillator 16 for generating the reference signal of, a mixer 17 for mixing a signal modulated according to the amount of phase adjustment calculated for each of the plurality of power satellites into the reference signal of, so as to generate the control signal, an amplifier 18 for amplifying the control signal to transmit the control signal to each of the plurality of power satellites 1, and a transmission antenna 19. The control satellite 3 is further provided with a location measurement unit 20 for measuring the location of each of the plurality of power satellites 1. A laser measurement unit can be used as the location measurement unit 20, and a measurement unit using an electromagnetic wave can be alternatively used. The control satellite 3 further includes a phase adjustment amount calculation unit 21 for calculating the amount of phase adjustment for each of the plurality of power satellites 1 based on a principle underlying the calculation of the phase adjustment amount, and a modulator 22 for modulating a signal according to the amount of phase adjustment calculated by the phase adjustment amount calculation unit 21.

Next, conversion of sunlight into a microwave and transmission of the microwave in each of the plurality of power satellites 1 will be explained. Each of the plurality of power satellites 1 focuses sunlight to the photoelectric conversion unit 5 by means of the condensing unit 4. This is because the energy density of the sunlight which the photoelectric conversion unit 5 constructed of a number of solar cells receives can be increased by focusing the sunlight to the photoelectric conversion unit 5. The condensing unit 4 can consist of a reflector or the like having a diameter of up to several tens of meters. As an alternative, the photoelectric conversion unit 5 can be so constructed as to receive sunlight directly, instead of the provision of the condensing unit 4. The photoelectric conversion unit 5 can consist of a plurality of solar panels arranged, and receive sunlight focused by the condensing unit 4 or directly receive sunlight and then photoelectric-convert the received sunlight into electrical energy. The electrical energy generated by the photoelectric conversion unit 5 is then input to the high power amplifier 12 within the transmission unit 6. Since the output of a solar cell is a DC component in general, the output is therefore changed in voltage and stabilized properly and is then input to the high power amplifier. The transmission unit 6 generates a microwave from the reference signal of included in the control signal which the transmission unit 6 has received from the control satellite 3 by way of the receiving antenna 8. The purpose of receiving the reference signal of from the control satellite 3 is to make the respective reference signals of in the plurality of power satellites 1 in phase with one another. The reference signal is then amplified by the amplifier 9 and is phase-shifted by the phase shifter 10. The incoherent modulator 11 incoherent-modulates the microwave output from the phase shifter 10 by using a modulation technique, such as a spread-spectrum modulation, so as to output an incoherent microwave. The spread-spectrum modulation is a modulation technique that reduces the strength of the output microwave and spreads a band of transmitted frequencies over a broad band, thereby preventing the interference between the output microwave and other microwaves. Fundamentally, the total energy of the output microwave is the same as that not-yet-spread-spectrum-modulated.

The high power amplifier 12 then amplifies the incoherent microwave from the incoherent modulator 11 with high power so as to output a microwave having power corresponding to the electrical energy generated by the photoelectric conversion unit 5. This microwave is sent out to space by way of the transmission antenna 7. The phase shifter 10 is instructed by the functional unit 14 to phase-shift the microwave from the amplifier 9 based on the amount of phase adjustment included in the control signal from the control satellite 3. The control signal from the control satellite 3 includes a signal which has been modulated according to the amount of phase adjustment calculated for each of the plurality of power satellites 1. The demodulation unit 13 demodulates the control signal. The functional unit 14 generates bit information to be set to the phase shifter 10 based on the demodulated amount of phase adjustment.

Next, the control of each of the plurality of power satellites by the control satellite 3 will be explained. The control satellite 3 sends light or the like aiming at the corner reflector 15 located on each of the plurality of power satellites 1 to measure the location of each of the plurality of power satellites 1 by means of the location measurement unit 20. The phase adjustment amount calculation unit 21 then calculates the amount of phase adjustment for each of the plurality of power satellites 1 from data on the measured location of each of the plurality of power satellites according to the principle underlying the phase adjustment amount calculation. The modulator 22 modulates a signal according to the amount of phase adjustment calculated for each of the plurality of power satellites 1. The oscillator 16 generates a reference signal of to be used by each of the plurality of power satellites, and the mixer 17 mixes the signal modulated according to the amount of phase adjustment into the reference signal f) so as to generate a control signal. The amplifier 18 amplifies the control signal to transmit it to each of the plurality of power satellites 1, and then transmits the amplified control signal to each of the plurality of power satellites 1 by way of the transmission antenna 19. The control satellite 3 further includes a communications antenna (not shown in FIG. 2) for catching a beacon signal from the electric power base in order to define a virtual plane S used for the calculation of the phase adjustment amount.

Each of the plurality of power satellites generates and transmits a microwave to the electric power base after making the generated microwave incoherent, as mentioned above. Combining of the plurality of incoherent microwaves at the electric power base will be explained with reference to FIG. 3. In the case where each of the plurality of power satellites generates and transmits a microwave to the electric power base after making the generated microwave coherent, as shown in the upper part of FIG. 3, the plurality of transmission antennas of the plurality of power satellites can be assumed to be a single phased array antenna having a large aperture, and therefore, a microwave having a narrow beam width and hence a high energy density can be transmitted to the receiving antenna of the electric power base. It is, however, undesirable to transmit such a high-energy-density microwave to the ground from the viewpoint of the flora and fauna environment and electric wave trouble. In contrast, in accordance with the present invention, the incoherent microwave, which is transmitted from each of the plurality of power satellites 1, does not interfere with any other microwave transmitted from any other one of the plurality of power satellites 1, and the receiving antenna of the electric power base thus receives a low-energy-density microwave having energy equal to the sum of the energies of the plurality of microwaves transmitted from the plurality of power satellites, as shown in the lower part of FIG. 3. Since each of the plurality of microwaves transmitted from the plurality of power satellites has a low energy density, but has a broad band, the sum of the energies of the plurality of microwaves is equal to that in the case as shown in the upper part of FIG. 3.

By adding one or more power satellites 1 constructed as above and applying the control signal from the control satellite 3 constructed as above to the added one or more power satellites, all of the generated microwaves including the microwaves from the added one or more power satellites can be made to be in phase with one another. Therefore, the electric power generation capability can be improved regardless of a limit on the photoelectric conversion capability of each of the plurality of power satellites 1, a limit on the high power amplification capability of each of the plurality of power satellites 1, and a limit on the power transmission capability.

As shown in FIG. 4, each of the plurality of power satellites 1 can include a plurality of condensing and power generating units 23 each for focusing sunlight and for generating electric power from the focused sunlight, and a plurality of transmission antennas 24 each for transmitting an incoherent microwave to space. Each of the plurality of power satellites 1 further includes a plurality of transmission units (not shown) each for generating and then incoherent-modulating a microwave based on part of the electric power from the plurality of condensing and power generating units 23 so as to generate the incoherent microwave to be transmitted to a corresponding one of the plurality of transmission antennas 24. Each of the plurality of condensing and power generating units 23 corresponds to the condensing unit 4 and the photoelectric conversion unit 5.

In accordance with the embodiment of the present invention, the space photovoltaic power generation system can thus transmit incoherent microwaves by way of the plurality of transmission antennas of the plurality of power satellites 1 to the electric power base, thus reducing the energy density of a composite microwave transmitted to the electric power base on the earth. The electric power transmission can thus be carried out with attention to the flora and fauna environment and electric wave trouble.

Many widely different embodiments of the present invention may be constructed without departing from the spirit and scope of the present invention. It should be understood that the present invention is not limited to the specific embodiments described in the specification, except as defined in the appended claims.

What is claimed is:

1. A space photovoltaic power generation system comprising:

a plurality of power satellites each for generating electrical energy from sunlight in space, for generating an incoherent microwave from the generated electrical energy, and for transmitting the incoherent microwave;

a control satellite having a control means for calculating an amount of phase adjustment for each of the plurality of power satellites based on a measured location of each of the plurality of power satellites, and for generating a control signal to be transmitted to each of the plurality of power satellites, said control signal being used by each of the plurality of power satellites for generating the incoherent microwave; and an electric power base located at a remote site for receiving a plurality of incoherent microwaves transmitted from said plurality of power satellites, and for generating electric power from the plurality of incoherent microwaves received.

2. The space photovoltaic power generation system according to claim 1, wherein each of said plurality of power satellites includes a condensing and power generating means for focusing sunlight in space and for converting the focused sunlight into electrical energy, and a transmission means for generating a microwave based on the electrical energy from said condensing and power generating means, for modulating the microwave so as to generate an incoherent microwave, and for transmitting the incoherent microwave to space.

3. The space photovoltaic power generation system according to claim 2, wherein said condensing and power generating means includes a plurality of condensing and power generating units each for focusing sunlight in space and for converting the focused sunlight into electrical energy, and said transmission means includes a plurality of transmission units each for generating a microwave based on the electrical energy from said condensing and power generating means, for modulating the microwave so as to generate an incoherent microwave, and for transmitting the incoherent microwave to space.

4. The space photovoltaic power generation system according to claim 1, wherein said electric power base includes a receiving means for receiving the plurality of incoherent microwaves transmitted from said plurality of power satellites, a microwave-to-DC conversion means for converting the plurality of incoherent microwaves received by said receiving means into DC electric power, and a transmission means for transmitting the DC electric power obtained by said microwave-to-DC conversion means.

5. A power satellite comprising:

a condensing and power generating means for focusing sunlight in space and for converting the focused sunlight into electrical energy;

a transmission means for generating a microwave based on the electrical energy from said condensing and power generating means, for modulating the microwave so as to generate an incoherent microwave, and for transmitting the incoherent microwave to space; and a receiver means for receiving a control signal from a control satellite in communication with the power satellite, said control signal including an amount of phase adjustment for the power satellite based on a measured location of the power satellite and being used by the power satellite for generating the incoherent microwave.

6. The power satellite according to claim 5, wherein said condensing and power generating means includes a plurality of condensing and power generating units each for focusing sunlight in space and for converting the focused sunlight into electrical energy, and said transmission means includes a plurality of transmission units each for generating a microwave based on the electrical energy from said condensing and power generating means, for modulating the microwave so as to generate an incoherent microwave, and for transmitting the incoherent microwave to space.

7. An electric power base comprising:
 a receiving means for receiving a plurality of incoherent microwaves transmitted from a plurality of power satellites;
 a microwave-to-DC conversion means for converting the plurality of incoherent microwaves received by said receiving means into DC electric power; and
 a transmission means for transmitting the DC electric power obtained by said microwave-to-DC conversion means,
 wherein the plurality of incoherent microwaves are generated by the plurality of power satellites based on a control signal transmitted by a control satellite in communication with the plurality of power satellites and the electric power base, said control signal including an amount of phase adjustment for the plurality of power satellites based on a measured location of the plurality power satellites.

8. The space photovoltaic power generation system according to claim 1, wherein each of the plurality of power satellites further uses the control signal to make respective reference signals in the plurality of power satellites in phase with one another.

9. The power satellite according to claim 5, wherein the power satellite further uses the control signal to make a reference signal in the power satellite in phase with a reference signal of other power satellites.

10. The electric power base according to claim 7, wherein each of the plurality of power satellites further uses the control signal to make respective reference signals in the plurality of power satellites in phase with one another.

11. A space photovoltaic power generation system comprising:
 a plurality of power satellites each configured to generate electrical energy from sunlight in space, to generate an incoherent microwave from the generated electrical energy and to transmit the incoherent microwave;
 a control satellite having a control unit configured to calculate an amount of phase adjustment for each of the plurality of power satellites based on a measured location of each of the plurality of power satellites, and to generate a control signal to be transmitted to each of the plurality of power satellites, said control signal being used by each of the plurality of power satellites to generate the incoherent microwave; and
 an electric power base located at a remote site and configured to receive a plurality of incoherent microwaves transmitted from said plurality of power satellites, and to generate electric power from the plurality of incoherent microwaves received.

12. The space photovoltaic power generation system according to claim 11, wherein each of said plurality of power satellites includes a condensing unit and a power generating unit configured to focus sunlight in space and to convert the focused sunlight into electrical energy, and a transmission unit to generate a microwave based on the electrical energy from said condensing and power generating units, to modulate the microwave so as to generate an incoherent microwave, and to transmit the incoherent microwave to space.

13. The space photovoltaic power generation system according to claim 12, wherein said condensing and power generating units include a plurality of condensing and power generating units each configured to focus sunlight in space and to convert the focused sunlight into electrical energy, and said transmission unit includes a plurality of transmission units each configured to generate a microwave based on the electrical energy from said plurality of condensing and power generating units, to modulate the microwave so as to generate an incoherent microwave, and to transmit the incoherent microwave to space.

14. The space photovoltaic power generation system according to claim 11, wherein said electric power base includes a receiving unit configured to receive the plurality of incoherent microwaves transmitted from said plurality of power satellites, a microwave-toDC conversion unit configured to convert the plurality of incoherent microwaves received by said receiving unit into DC electric power, and a transmission unit configured to transmit the DC electric power obtained by said microwave-to-DC conversion unit.

15. The space photovoltaic power generation system according to claim 11, wherein each of the plurality of power satellites further uses the control signal to make respective reference signals in the plurality of power satellites in phase with one another.

16. A power satellite comprising:
 a condensing and power generating unit configured to focus sunlight in space and to convert the focused sunlight into electrical energy;
 a transmission unit configured to generate a microwave based on the electrical energy from said condensing and power generating unit, to modulate the microwave so as to generate an incoherent microwave, and to transmit the incoherent microwave to space; and
 a receiver unit configured to receive a control signal from a control satellite in communication with the power satellite, said control signal including an amount of phase adjustment for the power satellite based on a measured location of the power satellite and being used by the power satellite to generate the incoherent microwave.

17. The power satellite according to claim 16, wherein said condensing and power generating units includes a plurality of condensing and power generating units each configured to focus sunlight in space and to convert the focused sunlight into electrical energy, and said transmission unit includes a plurality of transmission units each configured to generate a microwave based on the electrical energy from said condensing and power generating units, to modulate the microwave so as to generate an incoherent microwave, and to transmit the incoherent microwave to space.

18. The power satellite according to claim 16, wherein the power satellite further uses the control signal to make a reference signal in the power satellite in phase with a reference signal of other power satellites.

19. An electric power base comprising:
 a receiving unit configured to receive a plurality of incoherent microwaves transmitted from a plurality of power satellites;

a microwave-to-DC conversion unit configured to convert the plurality of incoherent microwaves received by said receiving unit into DC electric power; and a transmission unit configured to transmit the DC electric power obtained by said microwave-to-DC conversion unit, wherein the plurality of incoherent microwaves are generated by the plurality of power satellites based on a control signal transmitted by a control satellite in communication with the plurality of power satellites and the electric power base, said control signal including an amount of phase adjustment for the plurality of power satellites based on a measured location of the plurality power satellites.

20. The electric power base according to claim 19, wherein each of the plurality of power satellites further uses the control signal to make respective reference signals in the plurality of power satellites in phase with one another.

* * * * *